(12) United States Patent
Okasaka et al.

(10) Patent No.: US 9,980,206 B2
(45) Date of Patent: May 22, 2018

(54) BASE STATION, TERMINAL APPARATUS, AND INITIAL CONNECTION METHOD

(71) Applicant: Panasonic Corporation, Osaka (JP)

(72) Inventors: Shozo Okasaka, Kanagawa (JP);
Takayuki Sotoyama, Kanagawa (JP);
Seigo Nakao, Singapore (SG)

(73) Assignee: PANASONIC CORPORATION, Osaka (JP)

( * ) Notice: Subject to any disclaimer, the term of this patent is extended or adjusted under 35 U.S.C. 154(b) by 0 days. days.

(21) Appl. No.: 15/126,550

(22) PCT Filed: May 30, 2014

(86) PCT No.: PCT/JP2014/002876
§ 371 (c)(1),
(2) Date: Sep. 15, 2016

(87) PCT Pub. No.: WO2015/140838
PCT Pub. Date: Sep. 24, 2015

(65) Prior Publication Data
US 2017/0111850 A1    Apr. 20, 2017

(30) Foreign Application Priority Data
Mar. 20, 2014 (JP) .................................. 2014-058538

(51) Int. Cl.
*H04W 48/10* (2009.01)
*H04W 16/28* (2009.01)
(Continued)

(52) U.S. Cl.
CPC .......... *H04W 48/10* (2013.01); *H04L 7/0091* (2013.01); *H04W 16/28* (2013.01); *H04W 48/08* (2013.01);
(Continued)

(58) Field of Classification Search
None
See application file for complete search history.

(56) References Cited

U.S. PATENT DOCUMENTS

2010/0248659 A1*  9/2010  Kawabata ............ H04B 7/0617
455/115.1

FOREIGN PATENT DOCUMENTS

GB    2466161 A  *  6/2010  .......... H04W 74/002
JP    2008-113450 A     5/2008
(Continued)

OTHER PUBLICATIONS

3GPP TS 36.213 V12.0.0, 3rd Generation Partnership Project; Technical Specification Group Radio Access Network; Evolved Universal Terrestrial Radio Access (E-UTRA); Physical layer procedures (Release 12), Dec. 2013, 186 pages.
(Continued)

*Primary Examiner* — Hicham Foud
(74) *Attorney, Agent, or Firm* — Seed IP Law Group LLP

(57) ABSTRACT

In order to shorten the time in which an initial connection is established when switching directivity and then performing the initial connection, a frame timing control unit sets, until detection of an RACH signal, a transmission timing of a transmission frame for transmitting a search signal and a broadcast signal and also sets a reception-start timing for starting the reception of the corresponding RACH signal. A search/broadcast signal generation unit generates the broadcast signal and the search signal including reception-timing information. A beam directivity control unit sets, for a predetermined time starting from the reception-start timing, a directivity pattern such that the directivity is in the same direction as the directivity pattern for the corresponding transmission-timing information, whereby the beam directivity control unit controls a beam directivity operation unit.

4 Claims, 9 Drawing Sheets

(51) Int. Cl.
*H04W 48/08* (2009.01)
*H04L 7/00* (2006.01)
*H04W 74/08* (2009.01)
*H04W 76/02* (2009.01)

(52) U.S. Cl.
CPC ........ *H04W 74/0833* (2013.01); *H04W 76/02* (2013.01); *H04W 76/10* (2018.02)

(56) References Cited

FOREIGN PATENT DOCUMENTS

| | | | |
|---|---|---|---|
| JP | 2008-270940 | A | 11/2008 |
| JP | 2009-044667 | A | 2/2009 |
| JP | 2009-065509 | A | 3/2009 |
| JP | 4812127 | B2 | 11/2011 |
| JP | 5147443 | B2 | 2/2013 |

OTHER PUBLICATIONS

IEEE, "IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension," IEEE Computer Society, 203 pages.
International Search Report dated Sep. 2, 2014, for corresponding International Application No. PCT/JP2014/002876, 2 pages.

\* cited by examiner

BASE STATION, TERMINAL APPARATUS, AND INITIAL CONNECTION METHOD

TECHNICAL FIELD

The present invention relates to a base station configured to search for a terminal apparatus before establishing an initial connection, and also to a terminal apparatus and an initial connection method.

BACKGROUND ART

In 3GPP Long Term Evolution (LTE) mobile communication systems, a base station and a terminal apparatus establish an initial connection and perform communication using the following procedure.

The base station first transmits a search signal (discovery signal) such as PSS a primary synchronization signal (PSS)/secondary synchronization signal (SSS) and a broadcast channel signal (hereinafter referred to as "broadcast signal") such as a physical broadcast channel (PBCH). In this case, the base station transmits a search signal so that the search signal can be received in a whole cell area covered by the base station. In other words, a point at which it is not possible to receive the search signal transmitted from the base station is outside of the cell area covered by the base station because the terminal apparatus cannot detect the base station.

Here, the search signal is a reference signal sequence known to the base station and the terminal apparatus and is used for the terminal apparatus to detect the presence of the base station, detect a cell number, detect radio frame timing or measure receiving quality. The search signal is also referred to as a "synchronization signal" or "beacon signal" or the like. The broadcast signal includes information on a radio frame number and a system bandwidth of the base station.

The terminal apparatus detects the presence of the base station by receiving the search signal and measures receiving quality. When detecting a plurality of base stations, the terminal apparatus determines a base station having the highest receiving quality among the detected base stations to be the connection destination. Next, the terminal apparatus transmits a random access channel (RACH) signal (hereinafter referred to as "RACH signal") which is a connection request to the base station determined to be the connection destination. LTE provides 64 preamble sequences as signal sequences for random access channels. The terminal apparatus randomly selects one preamble sequence from among the 64 preamble sequences and transmits the preamble sequence to the base station. Upon receiving the RACH signal, the base station transmits a random access response (RAR) (hereinafter referred to as "RAR signal") which is an acknowledgment response to the terminal apparatus which is the sender of the RACH signal. The RAR signal includes radio resource allocation information for the terminal apparatus and identification number (Temporary cell radio network temporary identity (C-RNTI)) assigned to the terminal apparatus. The terminal apparatus performs communication with subsequent base stations using the radio resource allocation information and the identification number indicated by the RAR signal (Non-Patent Literature (hereinafter referred to as "NPL" 1).

In recent years, small base stations that carry out communication using a millimeter wave band are being introduced to secure a bandwidth of 1 GHz or greater in response to a drastic increase in traffic demand. Since such a small base station uses the millimeter wave band, the reachable distance of a radio wave cannot be extended and propagation loss increases significantly.

As a scheme that contributes to overcoming such propagation loss, enhancement of communication speed and expansion of a cell area, there is a scheme in which the base station performs directivity control (beam forming) using a plurality of antenna elements (antenna array). According to the scheme that performs directivity control, a radio wave transmitted by the base station is directed toward a direction in which the terminal apparatus is located, and the radio wave can thereby reach a farther point than non-directional transmission and the cell area to be covered can be expanded. Moreover, since the terminal apparatus can improve a signal to interference-plus-noise power ratio (SINK), it is possible to use a modulation scheme and a coding rate with high frequency utilization efficiency, and thus to carry out communication at a high transmission rate (NPL 2).

However, since the base station has no information for determining the direction in which the terminal apparatus is located at a stage before establishing an initial connection, it is not possible to direct the directivity toward only the direction in which the terminal apparatus is located to transmit a search signal.

Thus, the LTE mobile communication system proposes a method that divides a range intended to be used by the base station as a cell area into small portions according to the width of the directivity and transmits a search signal while successively switching the directivity so that directivity is directed toward each of the divided ranges. According to the method, it is possible to expand a coverage area through directivity control while covering the whole range to be set as the cell area by successive operation.

CITATION LIST

Non Patent Literature

NPL 1
  3GPP TS 36.213 V12.0.0 (2013-12) Evolved Universal Terrestrial Radio Access (E-UTRA); Physical Layer Procedures
NPL 2
  IEEE 802.15.3c-2009 Standard for Information Technology-Telecommunications and Information Exchange between systems-Local and Metropolitan area networks-Specific requirements-Part 15.3: Wireless Medium Access Control (MAC) and Physical Layer (PHY) Specifications for High Rate Wireless Personal Area Networks (WPANs): Millimeter-wave based Alternative Physical Layer Extension Amendment is ratified by Standards Board of IEEE.

SUMMARY OF INVENTION

Technical Problem

However, performing an initial connection while switching directivity involves a problem that the time required to establish the initial connection becomes long compared to a case with non-directional transmission.

An object of the present invention is to provide a base station, a terminal apparatus and an initial connection method capable of shortening the time until an initial connection is established when the initial connection is established while switching directivity.

Solution to Problem

A base station according to the present inventions is a base station that performs an initial connection with a terminal apparatus while switching directivity, the base station including: a timing control section that configures transmission timing for a search signal and a broadcast signal, and reception-start timing for an RACH; a transmitting section that directionally transmits, to the terminal apparatus at the transmission timing, the search signal and the broadcast signal including reception-timing information indicating the reception-start timing; a receiving section that directionally receives the RACH from the terminal apparatus for a predetermined period from the reception-start timing; and a directivity control section that controls directivity so that the directivity is directed toward a direction identical to a direction of a directivity pattern of the corresponding transmission timing for the predetermined period from the reception-start timing.

A terminal apparatus according to the present inventions is a terminal apparatus that transmits an RACH to a base station that performs an initial connection while switching directivity, the terminal apparatus including: a receiving section that receives, from the base station, a search signal and a broadcast signal including reception-timing information indicating reception-start timing for the RACH at the base station; a timing control section that controls transmission timing so that the RACH is transmitted within a predetermined period from the reception-start timing indicated by the reception-timing information; and a transmitting section that transmits the RACH at the transmission timing.

An initial connection method according to the present invention is a method for performing an initial connection between a base station that performs transmission and reception while switching directivity, and a terminal apparatus, the method including: configuring by the base station, transmission timing for a search signal and a broadcast signal and reception-start timing for an RACH; directionally transmitting, by the base station to the terminal apparatus at the transmission timing, the search signal and the broadcast signal including reception-timing information indicating the reception-start timing; receiving by the terminal apparatus, the search signal and the broadcast signal including the reception-timing information; controlling by the terminal apparatus, transmission timing so that the RACH is transmitted within a predetermined period from the reception-start timing indicated by the reception-timing information; transmitting by the terminal apparatus, the RACH at the controlled transmission timing; and controlling by the base station, directivity so that the directivity is directed toward a direction identical to a direction of a directivity pattern of the corresponding transmission timing for the predetermined period from the reception-start timing, and directionally receiving the RACH from the terminal apparatus.

Advantageous Effects of Invention

According to the present invention, it is possible to shorten the time until initial connection is established when the initial connection is performed while switching directivity.

DESCRIPTION OF EMBODIMENTS

Figure 1:
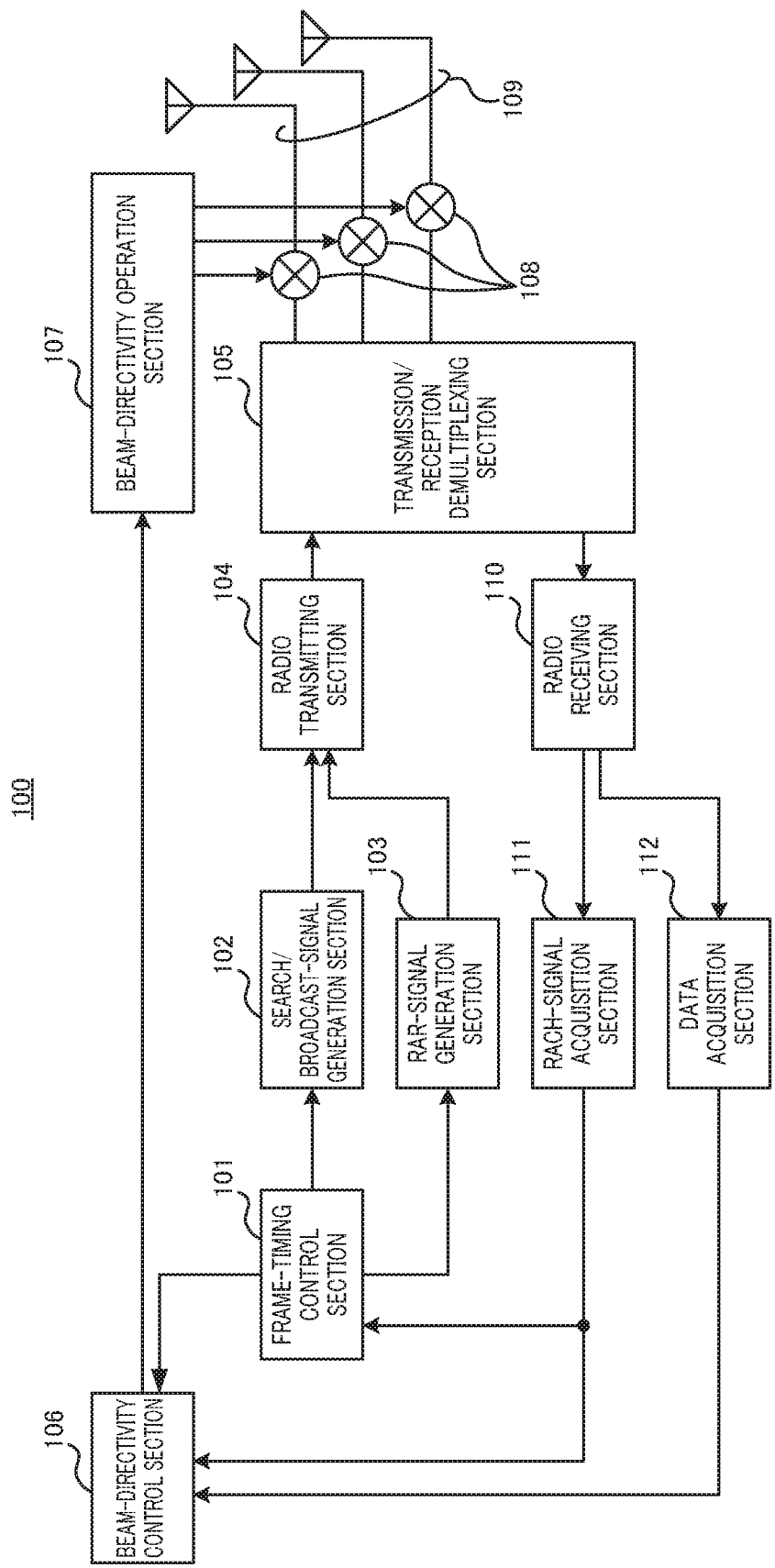
FIG. 1 is a block diagram illustrating a configuration of a base station according to Embodiment 1 of the present invention.

Hereinafter, a base station and a terminal apparatus according to embodiments of the present invention will be described in detail with reference to the accompanying drawings as appropriate.

Embodiment 1

<Configuration of Base Station>

First, a configuration of base station 100 according to Embodiment 1 of the present invention will be described with reference to FIG. 1.

Base station 100 includes frame-timing control section 101, search/broadcast-signal generation section 102, RAR-signal generation section 103, radio transmitting section 104, transmission/reception demultiplexing section 105, beam-directivity control section 106, beam-directivity operation section 107, multiplier 108, antenna array 109, radio receiving section 110, RACH-signal acquisition section 111, and data acquisition section 112.

Frame-timing control section 101 configures transmission timing of a transmission frame and reception timing of a reception frame. Frame-timing control section 101 generates transmission-timing information indicating transmission timing and reception-timing information indicating reception timing and outputs the timing information to beam-directivity control section 106.

Particularly, frame-timing control section 101 configures, until RACH-signal acquisition section 111 detects an RACH signal, transmission timing of a transmission frame in which a search signal and a broadcast signal in each directivity pattern are transmitted and reception-start timing to start reception of the corresponding RACH signal. Frame-timing control section 101 outputs, until RACH-signal acquisition section 111 detects the RACH signal, transmission-timing information and reception-timing information to search/broadcast-signal generation section 102 and beam-directivity control section 106. Note that the directivity pattern is defined by a width and a direction of directivity.

When RACH-signal acquisition section 111 detects the RACH signal, frame-timing control section 101 configures transmission timing of a transmission frame in which an RAR (acknowledge response) signal is transmitted. Frame-timing control section 101 outputs transmission-timing information indicating transmission timing of the RAR signal to RAR-signal generation section 103 and beam-directivity control section 106.

Search/broadcast-signal generation section 102 generates a search signal and a broadcast signal under the control of frame-timing control section 101 as a signal to establish an initial connection. In this case, search/broadcast-signal generation section 102 includes the reception-timing information outputted from frame-timing control section 101 for each of the search signal and the broadcast signal. Search/broadcast-signal generation section 102 outputs the search signal and the broadcast signal to radio transmitting section 104 at the transmission timing configured by frame-timing control section 101.

RAR-signal generation section 103 allocates a radio resource to a terminal apparatus which is the sender of an RACH signal and assigns an identification number thereto under the control of frame-timing control section 101. RAR-signal generation section 103 generates an RAR signal including resource allocation information indicating the allocated radio resources and the identification number. RAR-signal generation section 103 outputs the RAR signal to radio transmitting section 104 at the transmission timing configured by frame-timing control section 101.

Radio transmitting section 104 performs radio processing such as modulation, amplification or up-conversion on the search signal and the broadcast signal outputted from search/broadcast-signal generation section 102 and outputs the processed signals to transmission/reception demultiplexing section 105. Similarly, radio transmitting section 104 performs radio processing such as modulation, amplification or up-conversion on the RAR signal outputted from RAR-signal generation section 103 and outputs the processed RAR signal to transmission/reception demultiplexing section 105.

Transmission/reception demultiplexing section 105 switches the connection (output of the search signal and the broadcast signal or the RAR signal to multiplier 108) between radio transmitting section 104 and multiplier 108, and the connection (output of the received signal to radio receiving section 110) between radio receiving section 110 and multiplier 108.

Beam-directivity control section 106 configures a directivity pattern for every transmission frame and every reception frame with reference to the transmission-timing information and the reception-timing information outputted from frame-timing control section 101. Beam-directivity control section 106 controls beam-directivity operation section 107 so as to form the configured directivity patterns by sequentially switching the set directivity patterns.

Particularly, beam-directivity control section 106 configures, until RACH-signal acquisition section 111 detects an RACH signal, a directivity pattern so that directivity is directed toward the same direction as that of the directivity pattern in the corresponding transmission-timing information for a predetermined period from the reception-start timing based on the reception-timing information.

Note that beam-directivity control section 106 can configure a directivity pattern to be directed toward one search direction or directivity pattern to be directed toward each of a plurality of search directions in accordance with performance of base station 100.

When RACH-signal acquisition section 111 detects an RACH signal, beam-directivity control section 106 sets a directivity pattern directed toward the terminal apparatus which is the sender of the RACH signal and controls beam-directivity operation section 107 so as to form the configured directivity pattern. When data acquisition section 112 acquires data, beam-directivity control section 106 configures a directivity pattern directed toward the terminal apparatus which is the sender of the data and controls beam-directivity operation section 107 so as to form the configured directivity pattern.

Beam-directivity operation section 107 outputs a weighting factor to form directivity for every frame to multiplier 108 under the control of beam-directivity control section 106.

Multiplier 108 multiplies a transmission signal outputted from transmission/reception demultiplexing section 105 or a received signal received by antenna array 109 by the weighting factor outputted from beam-directivity operation section 107. Thus, the transmission signal is transmitted directionally and the received signal is received directionally.

Radio receiving section 110 performs radio processing such as down-conversion, amplification or demodulation on the received signal outputted from transmission/reception demultiplexing section 105 and outputs the processed received signal to RACH-signal acquisition section 111 and data acquisition section 112.

RACH-signal acquisition section 111 detects an RACH signal from the signal outputted from radio receiving section 110 and outputs the detection result (whether or not the RACH signal has been successfully detected) to frame-timing control section 101 and beam-directivity control section 106.

Data acquisition section 112 acquires data from the signal outputted from radio receiving section 110 and outputs the acquisition result (whether or not the data has been successfully acquired) to beam-directivity control section 106.

<Configuration of Terminal Apparatus>

Next, a configuration of terminal apparatus 200 according to Embodiment 1 of the present invention will be described with reference to FIG. 2.

Terminal apparatus 200 includes antenna 201, transmission/reception demultiplexing section 202, radio receiving section 203, search/broadcast-signal acquisition section 204, RAR-signal acquisition section 205, frame-timing control section 206, RACH-signal generation section 207, and radio transmitting section 208.

Transmission/reception demultiplexing section 202 switches the connection (output of a received signal to radio receiving section 203) between antenna 201 and radio receiving section 203 and the connection (output of a transmission signal to antenna 201) between antenna 201 and radio transmitting section 208.

Radio receiving section 203 performs radio processing such as down-conversion, amplification or demodulation on a received signal outputted from transmission/reception demultiplexing section 202 and outputs the processed received signal to search/broadcast-signal acquisition section 204 and RAR-signal acquisition section 205.

Search/broadcast-signal acquisition section 204 extracts a search signal and a broadcast signal from the signal outputted from radio receiving section 203 and outputs the extracted signal to frame-timing control section 206.

RAR-signal acquisition section 205 extracts an RAR signal from the signal outputted from radio receiving section 203 and outputs the RAR signal to frame-timing control section 206.

Frame-timing control section 206 measures channel quality with respect to base station 100 using a search signal and selects base station 100 having predetermined channel quality or higher, as destination base station 100. Frame-timing control section 206 configures a bandwidth with reference to a broadcast signal. Frame-timing control section 206 controls RACH-signal generation section 207 so as to transmit an RACH signal to base station 100 using the configured bandwidth. In this case, frame-timing control section 206 extracts reception-timing information included in the search signal or broadcast signal outputted from search/broadcast-signal acquisition section 204 and outputs the reception-timing information to RACH-signal generation section 207.

RACH-signal generation section 207 generates an RACH signal under the control of frame-timing control section 206 and outputs the RACH signal to radio transmitting section 208 so that the RACH signal is received by base station 100 within a predetermined period from the timing indicated by reception-timing information.

Radio transmitting section 208 performs radio processing such as modulation, amplification or up-conversion on the RACH signal outputted from RACH-signal generation section 207 and outputs the processed RACH signal to transmission/reception demultiplexing section 202.

<Operations of Base Station and Terminal Apparatus>

Figure 3:
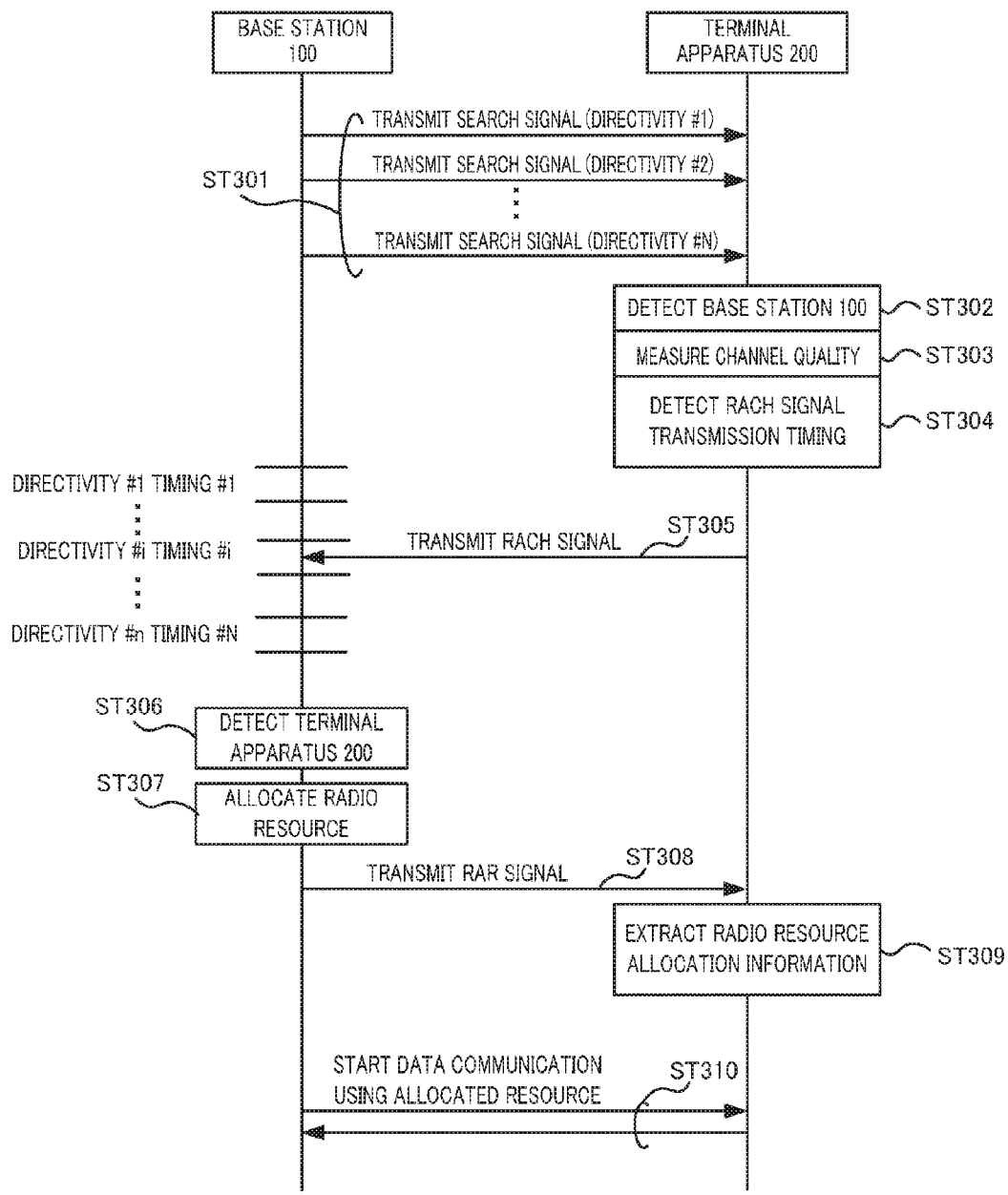
FIG. 3 is a sequence diagram illustrating operations of the base station and the terminal apparatus according to Embodiment compared to a case with non-directional transmission, 1 of the present invention.

Next, operations of base station 100 and terminal apparatus 200 according to Embodiment 1 of the present invention will be described with reference to FIG. 3.

First, base station 100 forms directivities #1 to #N corresponding to respective search directions by sequentially switching from one directivity to another and transmits a search signal and a broadcast signal with directivity (ST301). In this case, base station 100 includes reception-timing information in the search signal and the broadcast signal.

Next, terminal apparatus 200 detects base station 100 by acquiring the search signal and the broadcast signal (ST302) and measures channel quality with respect to the detected base station (ST303). Here, suppose that terminal apparatus 200 has acquired the search signal and the broadcast signal with directivity #i ("i" is a natural number equal to or greater than one but not greater than "n").

Terminal apparatus 200 acquires reception-timing information from the search signal or broadcast signal and detects timing to transmit an RACH signal based on the reception-timing information (ST304). The reception-timing information indicates start timing #i at which base station 100 forms directivity #i.

Next, terminal apparatus 200 transmits the RACH signal at any given timing within a predetermined period from timing #i indicated by the reception-timing information (ST305).

Base station 100 can detect the RACH signal transmitted from terminal apparatus 200 by receiving the RACH signal with directivity #i directed toward terminal apparatus 200 within the predetermined period from timing #i (ST306). Note that if a plurality of terminal apparatuses that have simultaneously received search signals transmit RACH signals, causing collisions among these RACH signals, base station 100 cannot detect the RACH signals. Therefore, each terminal apparatus that transmits an RACH signal continues to transmit the RACH signal until base station 100 detects the RACH signal or the number of transmissions reaches an upper limit. On the other hand, base station 100 maintains the directivities to be directed toward the respective search directions for a predetermined period when receiving the RACH signal with directivity taking into account the above-described collisions. In this case, the narrower the width of directivity base station 100 makes, the lower is the probability that a plurality of terminal apparatuses 200 may be located in areas where terminal apparatuses 200 can communicate with base station 100, and it is thereby made possible to reduce the probability that collision among RACH signals may occur. Therefore, the narrower the directivity base station 100 makes, the shorter can be the time during which the directivities directed toward the respective search directions are maintained.

Next, base station 100 allocates a radio resource to terminal apparatus 200 which is the sender of the detected RACH signal (ST307).

Next, base station 100 transmits an RAR signal including resource allocation information indicating the allocated radio resource and an identification number assigned to the detected terminal apparatus to terminal apparatus 200 (ST308).

Next, terminal apparatus 200 acquires the RAR signal and extracts the resource allocation information from the RAR signal (ST309). In this way, base station 100 and terminal apparatus 200 establish an initial connection.

After that, base station 100 and terminal apparatus 200 start data communication using the radio resource allocated by base station 100 (ST310).

Thus, according to the present embodiment, when performing an initial connection while switching directivity, base station 100 notifies terminal apparatus 200 of timing at which to start receiving directivity, using a search signal and a broadcast signal. When terminal apparatus 200 transmits an RACH signal, base station 100 can thereby reliably direct directivity toward the direction of terminal apparatus 200, can improve a success rate of receiving the RACH signal and shorten the time until an initial connection is established.

Note that when base station 100 has a capability to form a plurality of directivities and perform reception processes simultaneously, reception timings corresponding to the respective directivities may be identical. In this case, performing reception processes simultaneously makes it possible to reduce the reception timing resources to be provided by base station 100. That is, it is possible to flexibly adjust the number of reception timings in accordance with the number of directivities with which base station 100 can simultaneously receive signals and efficiently use radio resources. When simultaneously receiving RACH signals using a plurality of directivities, base station 100 selects a set of directivities with high orthogonality. For example, when it is assumed that directivities can take an orientation of 360° and RACH signals are simultaneously received from m directions (m is a plural number), base station 100 uses a plurality of directivities for which an interval calculated by dividing 360 by m is assumed to be a minimum interval. Thus, base station 100 can minimize interference among received signals with different directivities and even when a plurality of terminal apparatuses 200 corresponding to the different directivities simultaneously transmit RACH signals, it is possible to increase the probability that base station 100 can normally receive the RACH signals.

Note that a case has been described in the present embodiment where only the base station performs directional transmission/reception, but without being limited to this, the present invention may be adapted so that terminal apparatuses as well as the base station perform directional transmission/reception.

Embodiment 2

<Configuration of Base Station>

Next, a configuration of base station 400 according to Embodiment 2 of the present invention will be described with reference to FIG. 4. Note that in FIG. 4, the same components as those in FIG. 1 are assigned the same reference numerals and the description thereof will be omitted.

Figure 4:
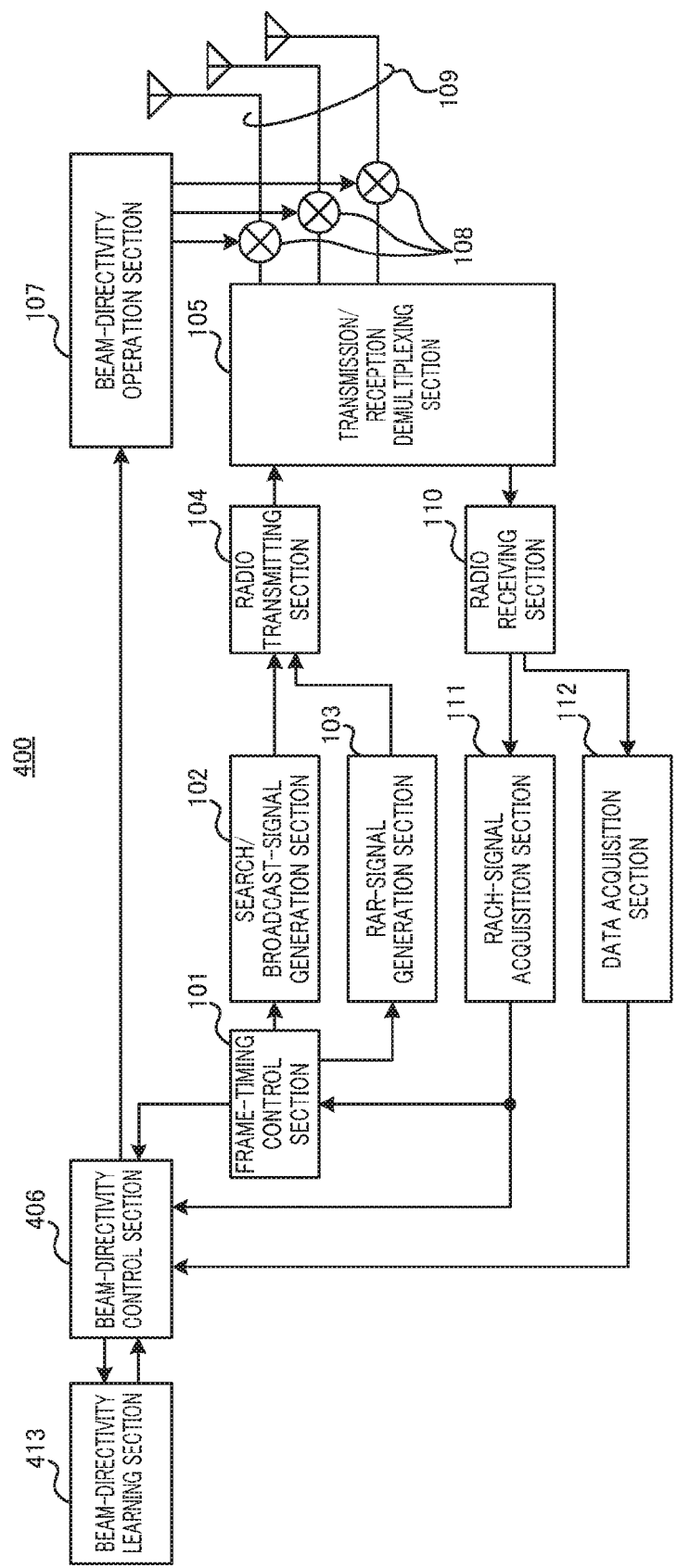
FIG. 4 is a block diagram of a base station according to Embodiment 2 of the present invention.

Base station 400 shown in FIG. 4 is different from base station 100 shown in FIG. 1 in the function of beam-directivity control section 406, which is different from that of beam-directivity control section 106. Compared to base station 100, base station 400 adopts a configuration with beam-directivity learning section 413 added.

Beam-directivity learning section 413 stores history information. Here, the history information is information indicating a history of RACH signals received from terminal apparatus 500 for each area (directivity pattern) (see FIG. 5), which is updated by beam-directivity control section 406 as appropriate. Note that, a more specific example of the history information will be described later.

Beam-directivity control section 406 includes all functions of beam-directivity control section 106. Beam-directivity control section 406 configures a directivity pattern for every transmission frame and every reception frame with reference to transmission-timing information and reception-timing information outputted from frame-timing control section 101. In this case, with reference to the history information stored in beam-directivity learning section 413, beam-directivity control section 406 sequentially configures directivity patterns in descending order of a detection probability of terminal apparatus 500. Beam-directivity control section 406 configures directivity patterns so that the directivity is narrowed for a search direction in which terminal apparatus 500 has a higher detection probability.

When RACH-signal acquisition section 111 detects an RACH signal, beam-directivity control section 406 writes information indicating that terminal apparatus 500 is detected in the directivity pattern into the history information stored in beam-directivity learning section 413 and updates the history information.

<Configuration of Terminal Apparatus>

Next, a configuration of terminal apparatus 500 according to Embodiment 2 of the present invention will be described with reference to FIG. 5. Note that in FIG. 5, the same components as those in FIG. 2 are assigned the same reference numerals and the description thereof will be omitted.

Figure 2:
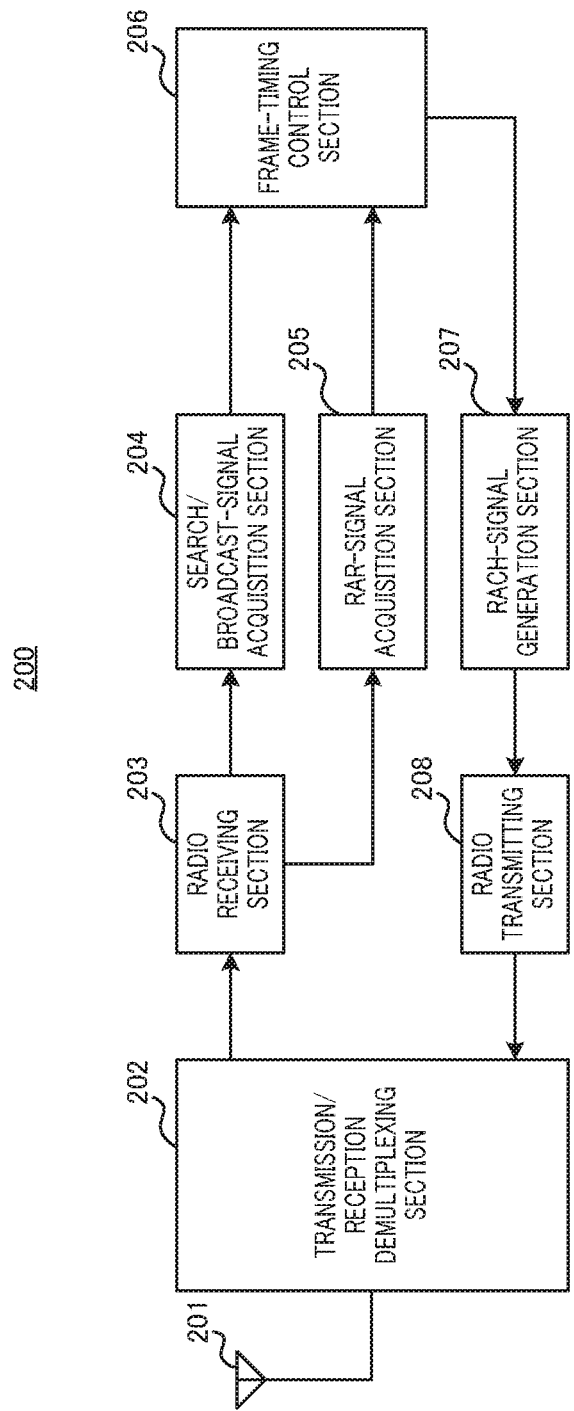
FIG. 2 is a block diagram illustrating a configuration of a terminal apparatus according to Embodiment 1 of the present invention.
Figure 5:
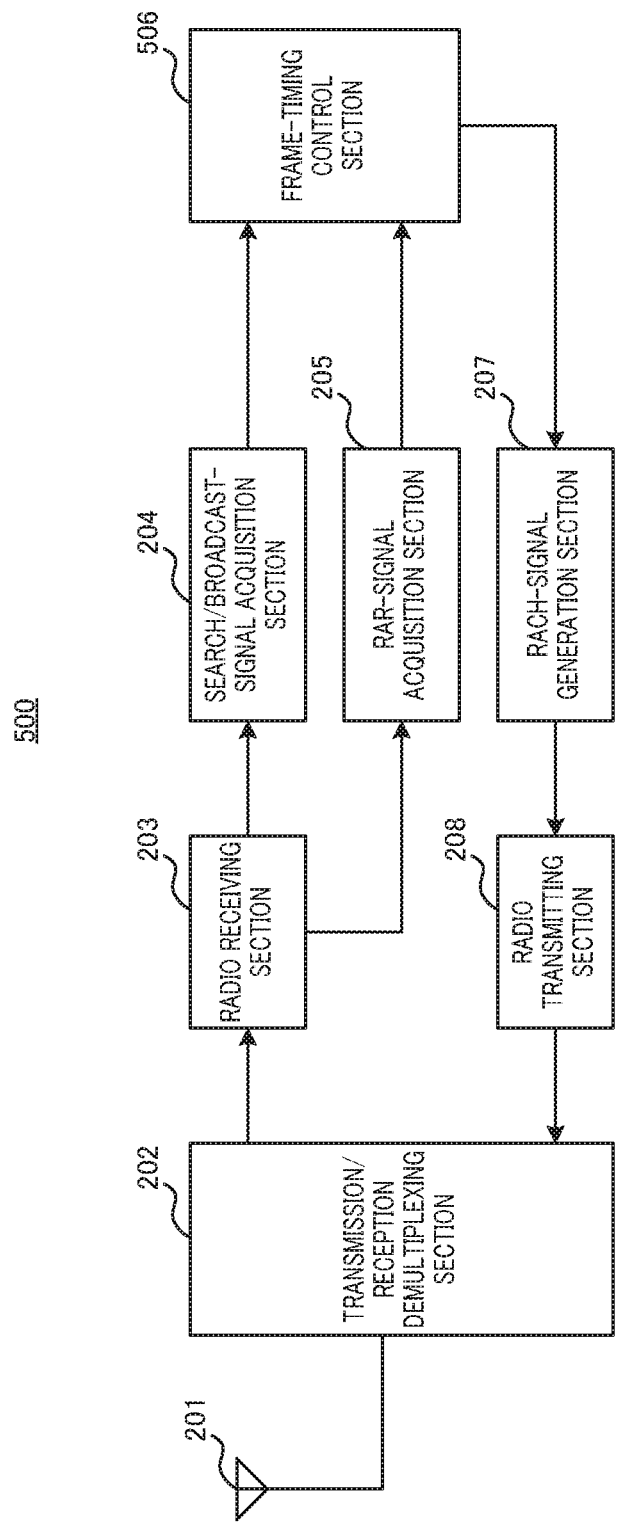
FIG. 5 is a block diagram illustrating a configuration of a terminal apparatus according to Embodiment 2 of the present invention.

Terminal apparatus 500 shown in FIG. 5 is different from terminal apparatus 200 shown in FIG. 2 in the function of frame-timing control section 506, which is different from that of frame-timing control section 206.

Frame-timing control section 506 includes all functions of frame-timing control section 206. Frame-timing control section 506 extracts reception-timing information included in a search signal having the best channel quality among a plurality of search signals which have been successfully received and outputs the reception-timing information to RACH-signal generation section 207.

<Operations of Base Station and Terminal Apparatus>

Next, operations of base station 400 and terminal apparatus 500 according to Embodiment 2 of the present invention will be described with reference to FIG. 6 to FIG. 9.

Figure 6:
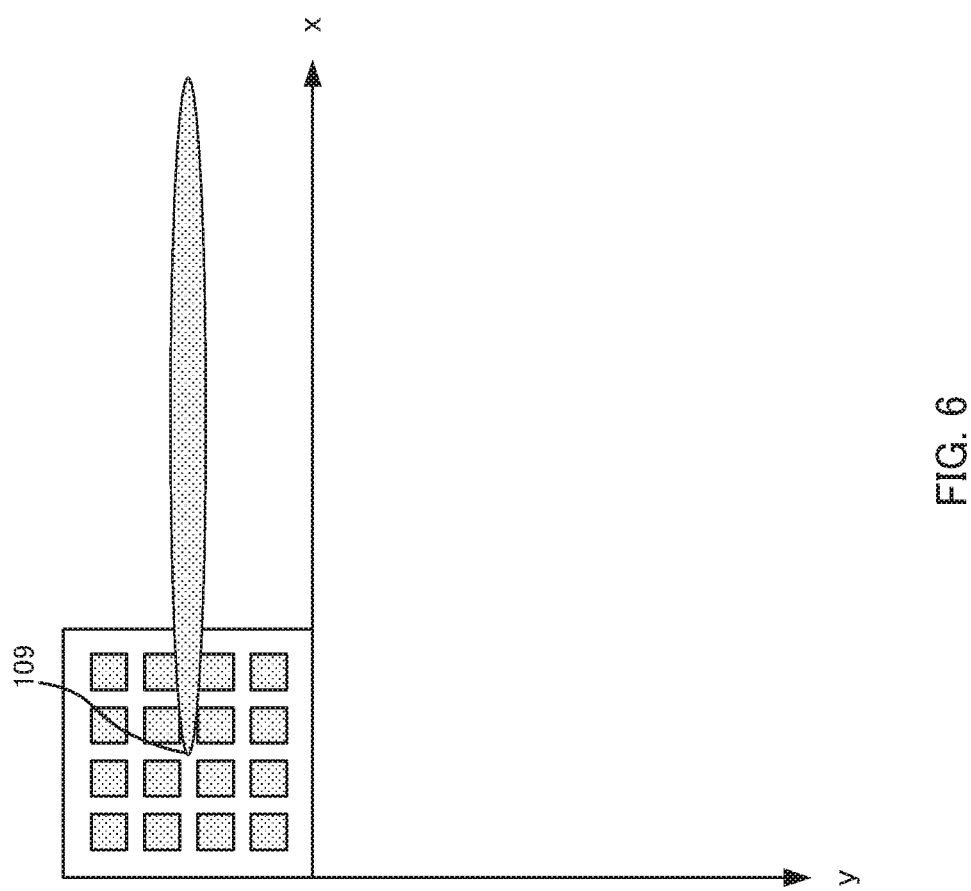
FIG. 6 is a diagram illustrating a directivity range according to Embodiment 2 of the present invention.
Figure 7:
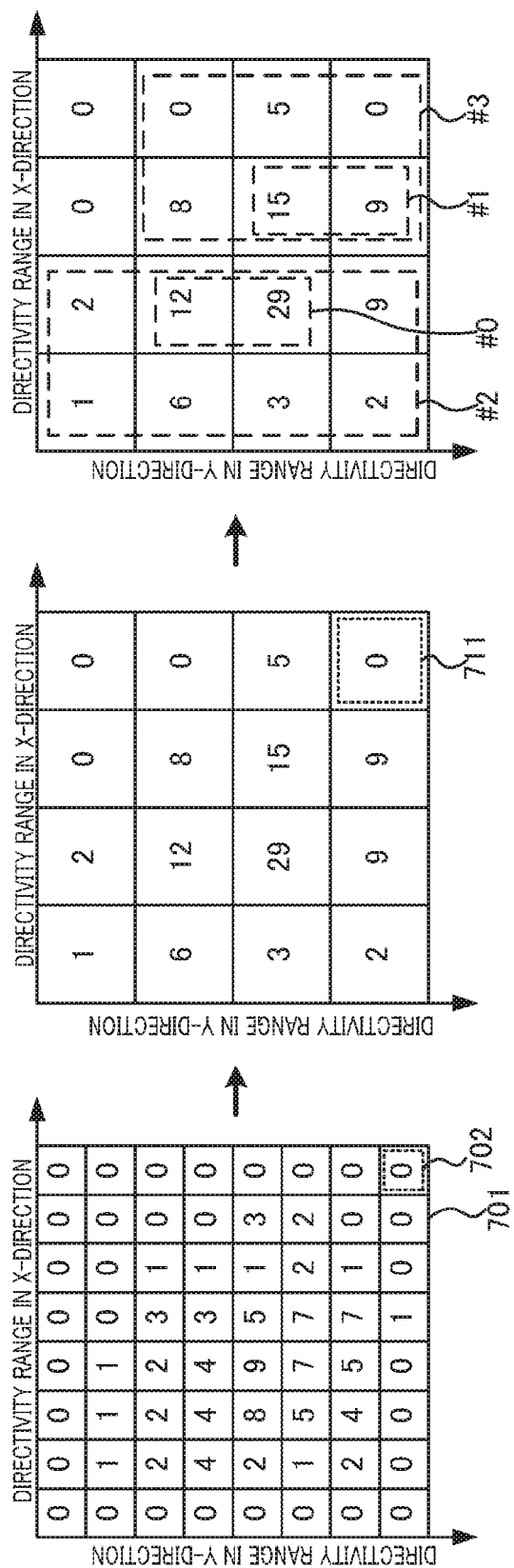
FIGS. 7A to 7C are diagrams illustrating tables storing history information according to Embodiment 2 of the present invention.

As shown in FIG. 6, base station 400 can direct a directivity toward one of regions obtained by dividing a directivity range made up of an x-y plane in which antenna array 109 is assumed to be the origin.

Beam-directivity learning section 413 stores history information in table 701 shown in FIG. 7A. Table 701 is obtained by dividing the x-y plane into a matrix form. Each small region 702 of the matrix corresponds to a range toward which base station 400 directs directivity. A numeral in each small region 702 represents the number of times terminal apparatus 500 is detected prior to an initial connection (hereinafter referred to as "detection count"). Here, the case where terminal apparatus 500 is detected is a case where an RACH signal is outputted from RACH-signal acquisition section 111 to beam-directivity control section 406.

With reference to table 701 in FIG. 7A, beam-directivity control section 406 configures medium region 711 composed of a predetermined number of small regions 702 in table 701 and assumes a total value of detection counts of respective small regions 702 included in set medium region 711 as a detection count in medium region 711.

Beam-directivity control section 406 regards a region having a higher detection count as medium region 711 having a higher detection probability of terminal apparatus 500 and configures directivity patterns so as to direct directivities toward medium regions 711 in descending order of detection count. Furthermore, beam-directivity control section 406 may calculate an average of detection counts of a large region made up of a plurality of adjacent medium regions 711 and configure directivity patterns so as to direct directivities toward regions in descending order of an average of detection counts. Beam-directivity control section 406 configures directivity patterns so as to narrow the directivity for medium regions or large regions 711 having a higher detection probability of terminal apparatus 500.

For example, as shown in FIG. 7C, beam-directivity control section 406 configures a directivity pattern in which priority is given to large region #0, which is a set of two medium regions 711 over large region #1, which is a set of two medium regions 711. Furthermore, beam-directivity control section 406 sets a directivity pattern in which the directivities of large regions #0 and #1 having a higher average value of detection count than that of large regions #2 and #3 are narrowed compared to the directivities of large regions #2 and #3.

Operations of base station 400 and terminal apparatus 500 after configuring the directivity pattern in the case where terminal apparatus 500 is detected with the narrowed directivity will be described using FIG. 8 first.

Figure 8:
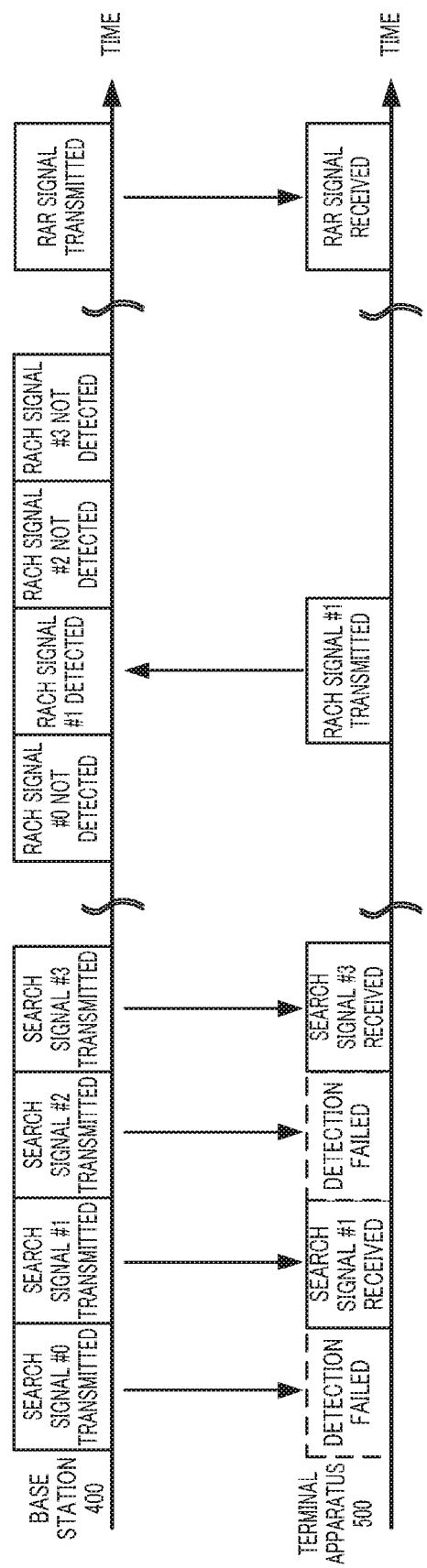
FIG. 8 is a diagram illustrating a procedure when an initial connection is successfully established with narrow directivity according to Embodiment 2 of the present invention.

As shown in FIG. 8, base station 400 transmits search signal #0 with a directivity pattern in which directivity is turned toward large region #0 shown in FIG. 7C first. In this case, suppose terminal apparatus 500 fails to receive a search signal and a broadcast signal.

Next, base station 400 transmits search signal #1 with a directivity pattern in which directivity is directed toward large region #1. In this case, suppose terminal apparatus 500 succeeds in receiving a search signal and a broadcast signal.

Next, base station 400 transmits search signal #2 with a directivity pattern in which directivity is directed toward large region #2. In this case, suppose terminal apparatus 500 fails to receive a search signal and a broadcast signal.

Next, base station 400 transmits search signal #3 with a directivity pattern in which directivity is directed toward large region #3. In this case, suppose terminal apparatus 500 succeeds in receiving a search signal and a broadcast signal.

Terminal apparatus 500 measures channel quality using successfully received search signal #1 and search signal #3 and gives, when the channel quality of search signal #1 is better than the channel quality of search signal #3, priority to a response to search signal #1.

Next, terminal apparatus 500 transmits RACH signal #1 as a response to search signal #1.

Base station 400 does not detect RACH signals #0, #2 and #3 for search signal #0, search signal #2 and search signal #3 but detects only RACH signal #1 for search signal #1. In this case, since base station 400 has narrowed the directivity directed toward large region #1, base station 400 immediately determines that communication is possible. As in the case of Embodiment 1 above, as terminal apparatus 500 narrows the directivity, base station 400 can shorten the time to maintain directivity directed toward each search direction.

Next, base station 400 transmits an RAR signal in response to detected RACH#1.

Base station 400 starts data communication with terminal apparatus 500 with a directivity pattern with directivity directed toward large region #1.

Next, a case where terminal apparatus 500 is detected with narrowed directivity will be described using FIG. 9.

Figure 9:
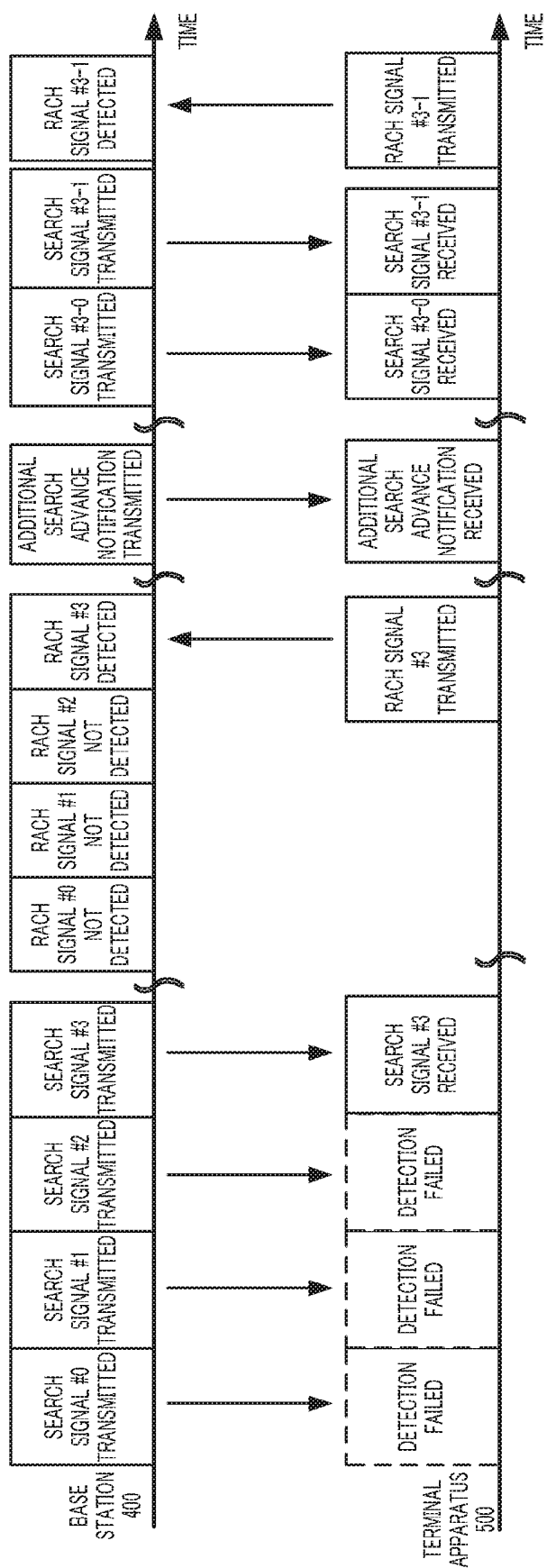
FIG. 9 is a diagram illustrating a procedure when an initial connection is successfully established with wide directivity according to Embodiment 2 of the present invention.

As shown in FIG. 9, base station 400 first transmits search signal #0 with a directivity pattern in which directivity is directed toward large region #0 shown in FIG. 7C. In this case, suppose terminal apparatus 500 fails to receive a search signal and a broadcast signal.

Next, base station 400 transmits search signal #1 with a directivity pattern in which directivity is directed toward large region #1. In this case, suppose terminal apparatus 500 fails to receive a search signal and a broadcast signal.

Next, base station 400 transmits search signal #2 with a directivity pattern in which directivity is directed toward large region #2. In this case, suppose terminal apparatus 500 fails to receive a search signal and a broadcast signal.

Next, base station 400 transmits search signal #3 with a directivity pattern in which directivity is directed toward large region #3. In this case, suppose terminal apparatus 500 succeeds in receiving a search signal and a broadcast signal.

Terminal apparatus 500 measures channel quality using successfully received search signal #3 and transmits, when the measured channel quality of search signal #3 is equal to or higher than a predetermined value, RACH signal #3 for search signal #3.

Next, base station 400 does not detect RACH signals #0 to #2 for search signals #0 to #2, but detects only RACH signal #3 for search signal #3. In this case, since base station 400 has widened the directivity directed toward large region #3, base station 400 transmits an additional search advance notification signal to report that an additional search will be performed.

Next, terminal apparatus 500 receives the additional search advance notification signal.

Next, base station 400 transmits search signal #3-0 with a directivity pattern in which directivity is directed toward large region #3-0 (not shown). In this case, suppose terminal apparatus 500 succeeds in receiving a search signal and a broadcast signal.

Next, base station 400 transmits search signal #3-1 with a directivity pattern in which directivity is directed toward large region #3-1 (not shown). In this case, suppose terminal apparatus 500 succeeds in receiving a search signal and a broadcast signal.

Terminal apparatus 500 measures channel quality using successfully received search signal #3-0 and search signal #3-1, compares the measured channel quality of search signal #3-0 with the channel quality of search signal #3-1 and gives, when the channel quality of search signal #3-1 is better than the channel quality of search signal #3-0, priority to a response to search signal #3-1.

Next, terminal apparatus 500 transmits RACH signal #3-1 for search signal #3-1.

Base station 400 does not detect RACH signal #3-0 for search signal #3-0 but detects only RACH signal #3-1 for search signal #3-1.

Next, base station 400 transmits an RAR signal for RACH signal #3-1.

Base station 400 starts data communication with terminal apparatus 500 with a directivity pattern in which directivity is directed toward large region #3-1.

Note that base station 400 can remove regions whose detection count is "0" from search targets or reduce the search frequency compared to other regions as shown in FIG. 7C.

Thus, when performing an initial connection while switching directivity, the present embodiment directs directivity toward regions in descending order of the detection probability of terminal apparatus 500 based on past records, and can thereby shorten the time until communication is established.

Furthermore, the present embodiment narrows the directivity directed toward areas having a high detection probability of terminal apparatus 500, and can thereby improve the channel quality between base station 400 and terminal apparatus 500 with that directivity, and can thereby reliably detect terminal apparatuses.

Note that, when installing the base station, the present embodiment may be designed so as to prevent the base station from configuring any directivity pattern in which the base station directs directivity toward a ceiling direction.

Furthermore, the present embodiment may be configured to provide the base station with an acceleration sensor so as to configure a directivity range of the X-direction and the Y-direction of a table based on the detection result of the acceleration sensor.

The present embodiment may be configured to configure a table so as to prevent overlapping in the search directions between neighboring base stations according to communication between the base stations or instructions from a higher layer station of the base stations.

The present embodiment may be configured to receive notification from a nearby base station of a direction in which there is a high possibility that terminal apparatuses may be located and configure a directivity pattern in which directivity is directed toward that direction.

A case has been described in the present embodiment as an example where an initial connection is established, but the present invention is not limited to this, and the present invention is also applicable to a case where handover between cells takes place. For example, a terminal apparatus that performs handover between cells may receive a search signal from the handover destination base station and then transmit to the handover source base station, quality measurement information instead of a connection request when performing an initial connection.

A case has been described in the present embodiment where history information is information indicating a history of reception of RACH signals, but the present invention is not limited to this, and the history information may be a history of directivities formed by the base station.

A case has been described in the present embodiment where only the base station performs directional transmission/reception, but the present invention is not limited to this, and terminal apparatuses as well as a base station may be configured to perform directional transmission/reception.

In this case, the table in FIG. 7A may be shared between the terminal apparatuses and the base station. The terminal apparatus can acquire the table from a nearby base station or a base station with which the terminal apparatus is in communication. This allows the terminal apparatus to efficiently transmit an RACH signal to the base station, reduce the overhead of communication, reduce consumption of transmission power and suppress interference with peripheral cells.

The disclosure of Japanese Patent Application No. 2014-058538, filed on Mar. 20, 2014, the contents of which including the specification and drawings are incorporated herein by reference in its entirety.

INDUSTRIAL APPLICABILITY

The present invention is suitable for use in a base station and a terminal apparatus in an LTE mobile communication system.

REFERENCE SIGNS LIST 100, 400 Base station
101, 206, 506 Frame-timing control section
102 Search/broadcast-signal generation section
103 RAR-signal generation section
104, 208 Radio transmitting section
105, 202 Transmission/reception demultiplexing section
106, 406 Beam-directivity control section
107 Beam-directivity operation section
108 Multiplier
109 Antenna array
110, 203 Radio receiving section
111 RACH-signal acquisition section
112 Data acquisition section
200, 500 Terminal apparatus
201 Antenna
204 Search/broadcast-signal acquisition section
205 RAR-signal acquisition section
207 RACH-signal generation section
413 Beam-directivity learning section

The invention claimed is:

1. A base station which, in operation, performs an initial connection with a terminal apparatus while switching directivity, the base station comprising:
    timing control circuitry, which, in operation,
    configures transmission timing for a search signal and a broadcast signal, and reception-start timing for a Random Access Channel (RACH) signal;
    a transmitter, which, in operation, transmits, using a first directivity pattern, to the terminal apparatus at the transmission timing, the search signal and the broadcast signal including reception-timing information indicating the reception-start timing;
    a receiver, which, in operation, receives, using a second directivity pattern, the RACH signal from the terminal apparatus for a determined period from the reception-start timing; and
    directivity control circuitry, which, in operation, controls directivity so that a direction of the second directivity pattern is directed toward a direction identical to a direction of the first directivity pattern of the corresponding transmission timing for the determined period from the reception-start timing; and
    a memory, which, in operation, stores, for each of a plurality of regions obtained by dividing a directivity range, history information indicating a history of directivity patterns with which the RACH signal is received,
    wherein the directivity control circuitry, in operation, calculates a detection probability of the terminal apparatus for each one of the plurality of regions with reference to the history information, and configures a directivity pattern so that a direction of the directivity pattern is directed toward the plurality of regions in descending order of detection probability.

2. The base station according to claim 1, wherein the directivity control circuitry, in operation, configures a directivity pattern so that the higher the detection probability is, the narrower the directivity becomes.

3. A terminal apparatus, which, in operation, transmits a Random Access Channel (RACH) signal to a base station that performs an initial connection while switching directivity, the terminal apparatus comprising:
    a receiver, which, in operation, receives, from the base station, a plurality of search signals and a broadcast signal including reception-timing information indicating reception-start timing for the RACH signal at the base station, wherein the plurality of search signals are transmitted using a first directivity pattern;
    timing control circuitry, which, in operation, controls transmission timing so that the RACH signal is transmitted within a determined period from the reception-start timing indicated by the reception-timing information and in accordance with a second directivity pattern; and
    a transmitter, which, in operation, transmits the RACH at the transmission timing, wherein a directivity pattern is configured so that a direction of the directivity pattern is in a descending order of detection probability based on history information of reception of RACH signals of the terminal apparatus for each of a plurality of regions obtained by dividing a directivity range.

4. An initial connection method for performing an initial connection between a base station that performs transmission and reception while switching directivity, and a terminal apparatus, the method comprising:
    configuring by the base station, transmission timing for a search signal and a broadcast signal and reception-start timing for an RACH;
    transmitting, by the base station to the terminal apparatus at the transmission timing using a first directivity pattern, the search signal and the broadcast signal including reception-timing information indicating the reception-start timing;
    receiving by the terminal apparatus, the search signal and the broadcast signal including the reception-timing information;
    controlling by the terminal apparatus, transmission timing so that the RACH is transmitted within a determined period from the reception-start timing indicated by the reception-timing information;
    transmitting by the terminal apparatus, the RACH at the controlled transmission timing;
    controlling by the base station, directivity so that a direction of a second directivity pattern is directed toward a direction identical to a direction of the first directivity pattern of the corresponding transmission timing for the determined period from the reception-start timing, and directionally receiving the RACH from the terminal apparatus using the second directivity pattern;
    storing, in a memory, by the base station, for each one of a plurality of regions obtained by dividing a directivity range, history information indicating a history of directivity patterns with which the RACH is received;
calculating, by the base station, a detection probability of the terminal apparatus for each one of the plurality of regions with reference to the history information; and
configuring, by the base station, a directivity pattern so that a direction of the directivity pattern is directed toward the plurality of regions in descending order of the detection probability.

* * * * *